United States Patent
Sordi et al.

(10) Patent No.: US 12,465,056 B2
(45) Date of Patent: Nov. 11, 2025

(54) METHOD OF WASHING MEAT CARCASS PARTS SUCH AS CATTLE CARCASS HALVES, AND A WASHING DEVICE

(71) Applicant: Marel Brasil Comercial e Industrial LTDA, Guapore-RS (BR)

(72) Inventors: Giovani Sordi, Guapore-RS (BR); Eder Brambatti, Guapore-RS (BR); Adalberto Klose, Guapore-RS (BR); Henrique Dal Corso Becker Herbstrith Roos, Guapore-RS (BR)

(73) Assignee: MAREL BRASIL COMERCIAL E INDUSTRIAL LTDA, Guapore-RS (BR)

( * ) Notice: Subject to any disclaimer, the term of this patent is extended or adjusted under 35 U.S.C. 154(b) by 0 days.

(21) Appl. No.: 18/603,445

(22) Filed: Mar. 13, 2024

(65) Prior Publication Data
US 2024/0306653 A1    Sep. 19, 2024

(30) Foreign Application Priority Data
Mar. 15, 2023   (EP) ..................................... 23162107

(51) Int. Cl.
*A22C 17/00*    (2006.01)
*A22C 17/08*    (2006.01)

(52) U.S. Cl.
CPC .......... *A22C 17/08* (2013.01); *A22C 17/0093* (2013.01)

(58) Field of Classification Search
CPC .... A22C 17/08; A22C 17/0093; A22B 5/0082
See application file for complete search history.

(56) References Cited

U.S. PATENT DOCUMENTS

| 4,279,059 | A | 7/1981 | Anderson et al. |
| 5,980,375 | A | 11/1999 | Anderson et al. |
| 2010/0297923 | A1* | 11/2010 | Brown ................. A22B 5/0082 452/173 |
| 2015/0264942 | A1* | 9/2015 | Espy ..................... F16K 11/076 137/625.46 |

FOREIGN PATENT DOCUMENTS

| WO | 9518535 A1 | 7/1995 |
| WO | 0025594 A1 | 5/2000 |
| WO | 2008073819 A1 | 6/2008 |

OTHER PUBLICATIONS

Extended European Search Report from Corresponding European Patent Application No. EP23162107.9, Sep. 4, 2023.

* cited by examiner

*Primary Examiner* — Richard T Price, Jr.
(74) *Attorney, Agent, or Firm* — Workman Nydegger

(57) ABSTRACT

A system and method of washing meat carcass parts such as cattle carcass halves suspended from and conveyed by an overhead conveyor, wherein the method is executed using a washing device comprising a first spraying device on a first side and a second spraying device on a second side of a processing path. The first and second spraying devices each have multiple pivotable nozzles. The method includes supplying pressurized washing liquid to the nozzles. The washing liquid is provided to at least some of the multiple nozzles of the first spraying device at a higher liquid pressure than a lower liquid pressure at which washing liquid is provided to the multiple nozzles of the second spraying device.

16 Claims, 8 Drawing Sheets

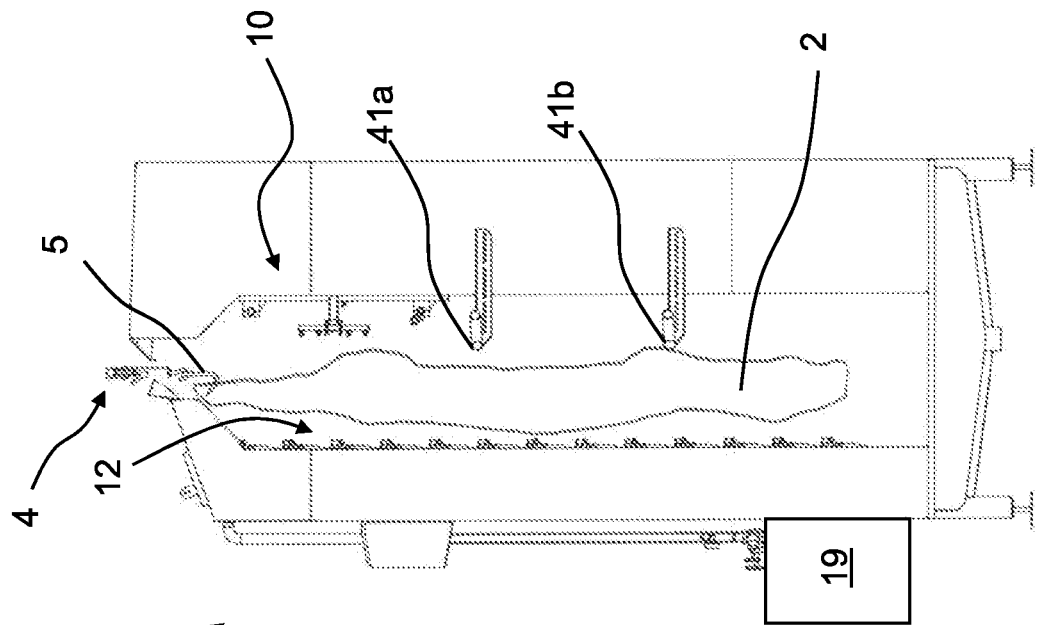
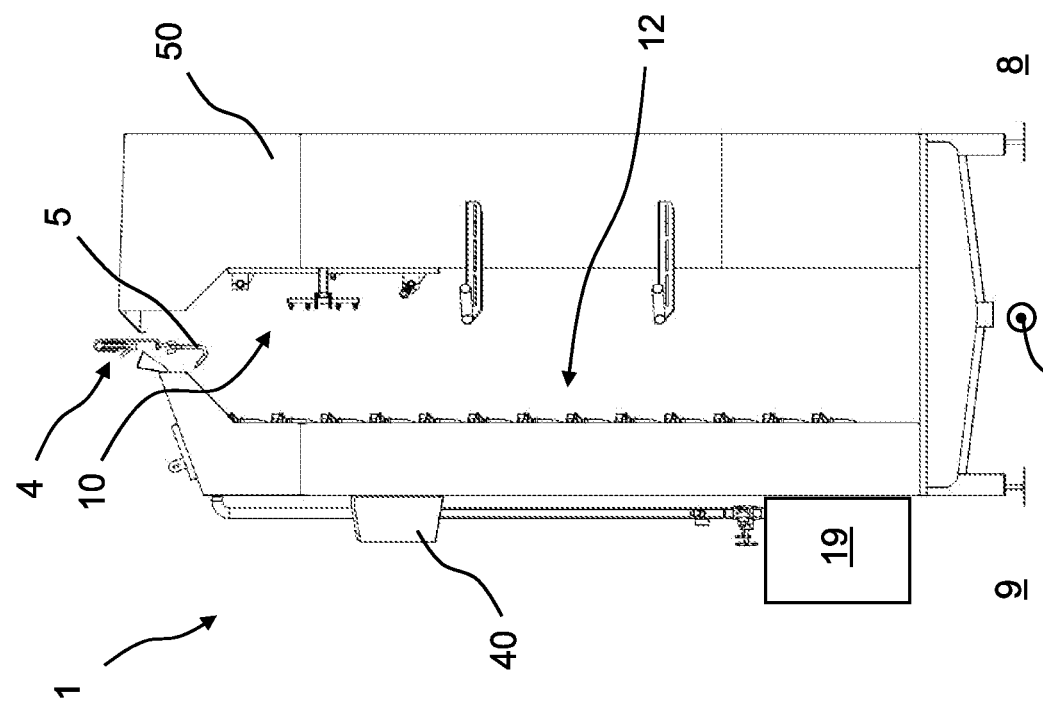
Fig. 1a
Fig. 1b

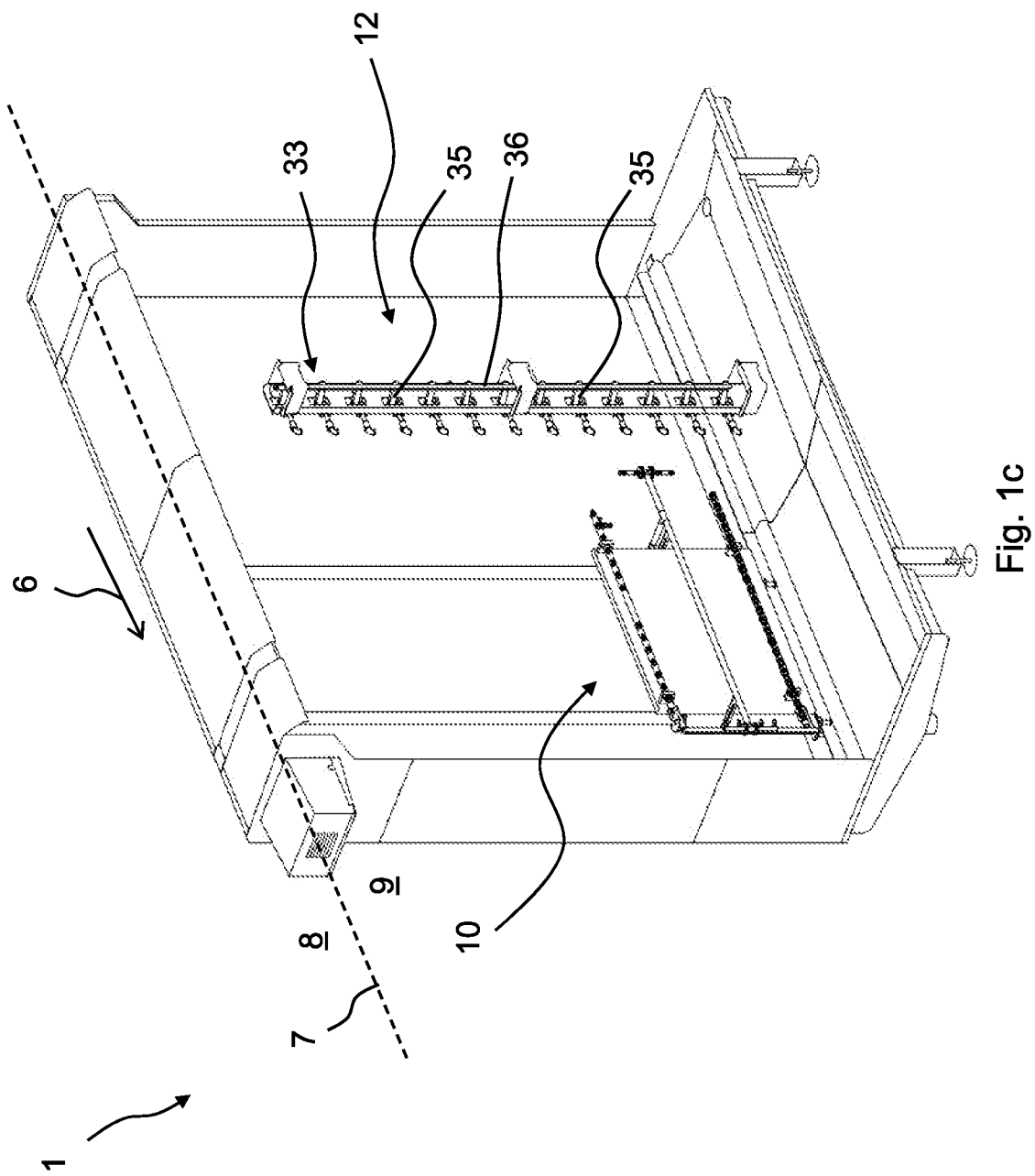

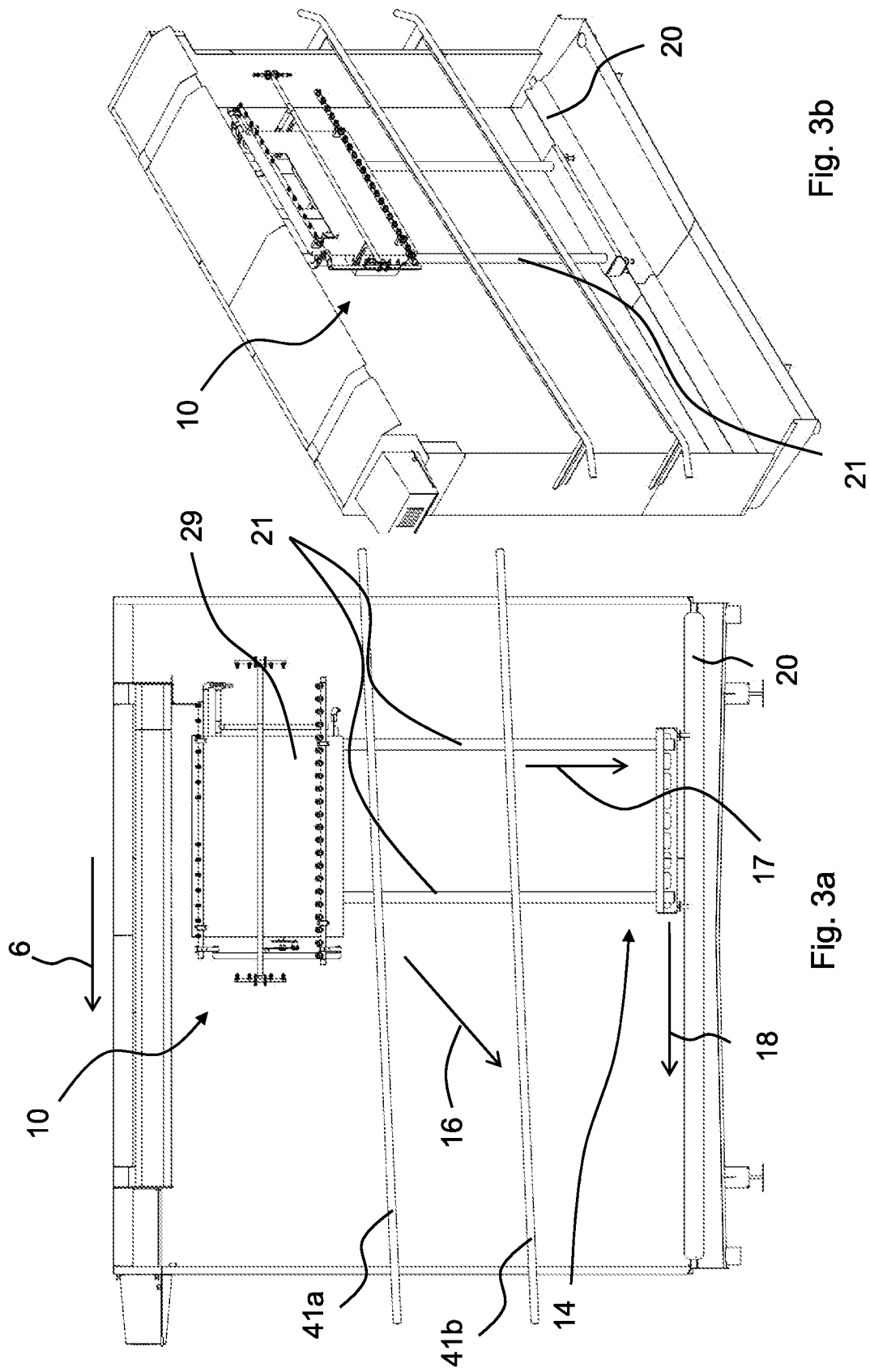

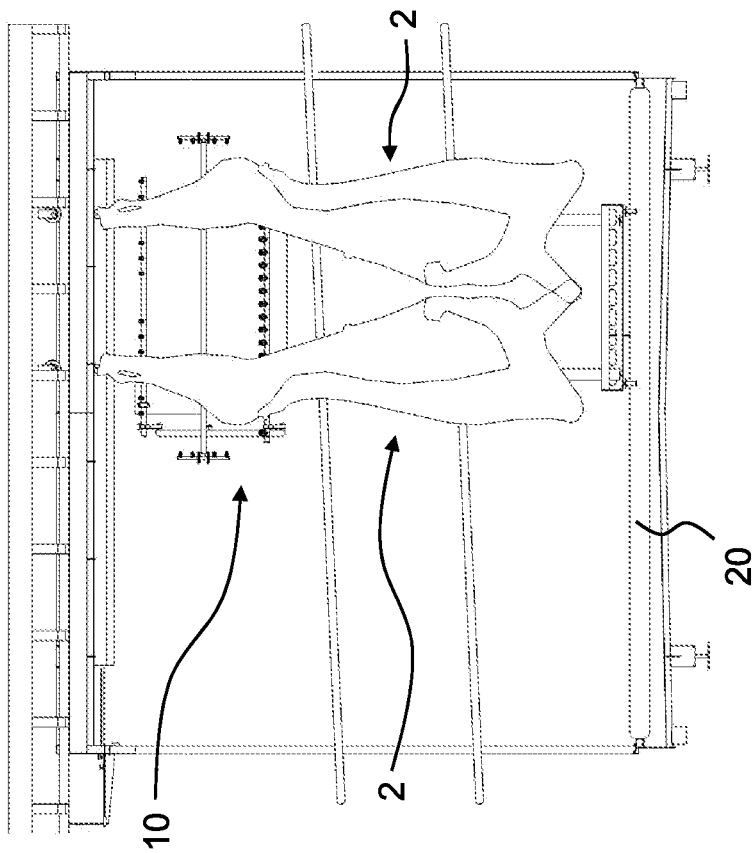
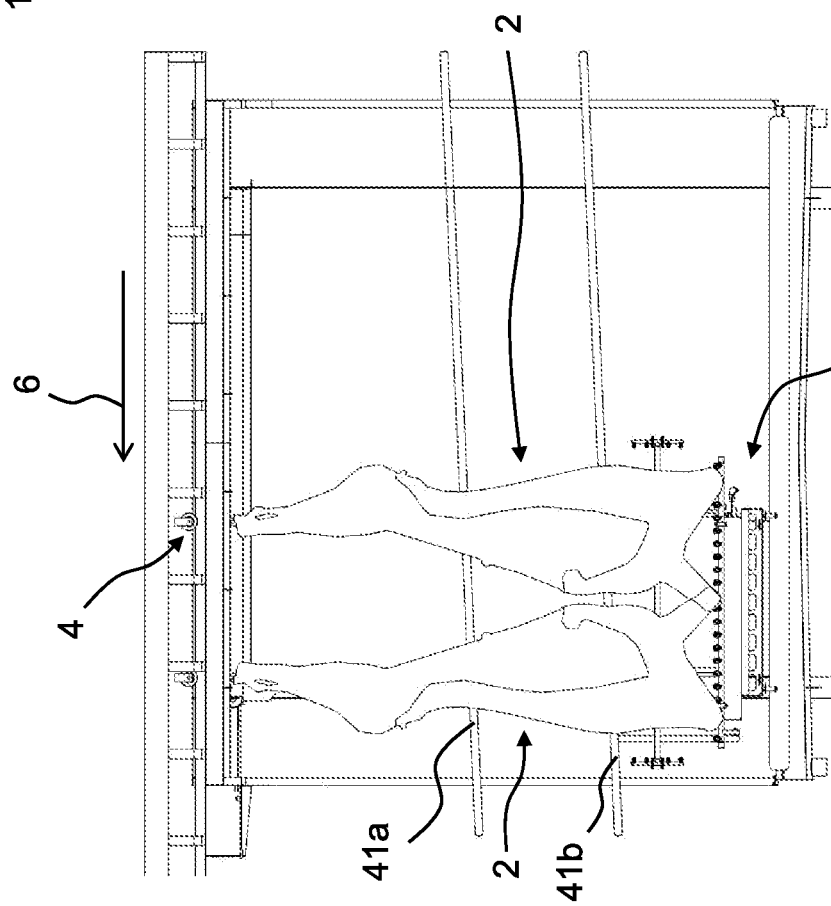

METHOD OF WASHING MEAT CARCASS PARTS SUCH AS CATTLE CARCASS HALVES, AND A WASHING DEVICE

TECHNICAL FIELD

The invention relates to a method of washing meat carcass parts including bovine, caprine and ovine meat carcass parts, such as carcass halves, for example cattle carcass halves, while the carcass parts are suspended from an overhead conveyor and are being conveyed in a conveying direction along a processing path. The invention also relates to a washing device for use in such a method.

BACKGROUND

Carcass washing devices are used to clean carcass parts in automated slaughter animal part processing systems. Using such washing devices, the amount of contaminants including bacteria on the carcass parts is reduced. The carcass parts may be cattle carcass halves resulting from splitting a carcass after evisceration thereof. There is room for further improvement of such washing devices and washing methods using such devices.

It is an object of the invention to provide an improved washing method and device, for washing such meat carcass parts suspended from an overhead conveyor and are being conveyed in a conveying direction along a processing path.

It is an objection of the invention to provide such a washing method and device, wherein possible damage to the carcass parts during the washing may be reduced.

It is an object of the invention to provide such a washing method and device, wherein energy usage, such as water usage, may be reduced.

SUMMARY

One or more of the above mentioned objects have been achieved by the washing device and/or by the method according to the present invention.

According to the invention, a washing device and a method for washing meat carcass parts such as cattle carcass halves are provided, while the carcass parts are suspended from an overhead conveyor and are being conveyed in a conveying direction along a processing path.

The method is executed using a washing device comprising a first spraying device provided on a first side of the processing path, a second spraying device provided on a second side, opposite the first side, of the processing path, wherein the first spraying device and the second spraying device each have multiple nozzles, and the washing device further has respective pivoting devices for pivoting nozzles of the multiple nozzles of the first spraying device and of the second spraying device in a reciprocating manner.

According to the method, the following steps are executed repetitively using the washing device:
a) supplying pressurized washing liquid to the multiple nozzles of the first spraying device and of the second spraying device such that the carcass part is being sprayed with the washing liquid from opposite sides while the carcass part passes between the spraying devices while conveyed in the conveying direction, wherein the washing liquid is provided to at least some of the multiple nozzles of the first spraying device at a higher liquid pressure than a lower liquid pressure at which washing liquid is provided to the multiple nozzles of the second spraying device; and
b) pivoting nozzles of the multiple nozzles of the first spraying device and of the second spraying device in a reciprocating manner, using the respective pivoting devices.

The washing device according to the invention comprises:
a first spraying device provided on a first side of the processing path;
a second spraying device provided on a second side, opposite the first side, of the processing path.

The first spraying device and the second spraying device each have multiple nozzles for spraying a washing liquid against a carcass part passing between the first and second spraying devices while conveyed in the conveying direction in use,
wherein the multiple nozzles of the first spraying device and of the second spraying device are connected to or connectable to a respective source of washing liquid.

The washing device further comprises:
respective pivoting devices for pivoting nozzles of the multiple nozzles of the first spraying device and of the second spraying device in a reciprocating manner while the carcass part passes between the spraying devices while conveyed in the conveying direction in use.

The washing device is configured to provide washing liquid to at least some of the multiple nozzles of the first spraying device at a higher liquid pressure than a lower liquid pressure at which washing liquid is provided to the multiple nozzles of the second spraying device. In an embodiment, the controller is configured to set the higher and the lower liquid pressures. Alternatively, the washing liquid may be provided at the required higher and lower liquid pressures from an external source, or from respective external sources, of washing liquid.

In an embodiment, the washing device according to the invention may be arranged for washing meat carcass parts in accordance with the method according to the invention.

An effect of the washing method and washing device according to the invention, having at least one of the first and second spraying devices and wherein, according to the method, the washing liquid is provided to at least some of the multiple nozzles of the first spraying device at a higher liquid pressure than a lower liquid pressure at which washing liquid is provided to the multiple nozzles of the second spraying device, is that a very effective manner of washing such cattle carcass parts may be realised, with a low consumption of washing liquid. Further, setting the liquid pressure differently between the first and second spraying devices in accordance with the method according to the invention, makes it possible to subject the more sensitive outer, fat side of the carcass part to lower liquid pressures which reduce the chance of damaging the fat side of the carcass part, while still washing the inner side of the carcass part in a highly effective manner. For this purpose, the carcass parts may be oriented during their conveyance through the washing device such that the outer, fat side faces the second spraying device. By providing liquid to at least some of the multiple nozzles of the first spraying device at a higher liquid pressure than a lower liquid pressure at which washing liquid is provided to the multiple nozzles of the second spraying device, a larger water impact force on the carcass parts is realised by the at least some of the multiple nozzles of the first spraying device compared to the water impact force on the carcass parts by the multiple nozzles of the second spraying device.

In an embodiment which can make the use of the washing device more effective the washing device comprises a moving device for moving the first spraying device and wherein the method comprises step c) moving the first spraying device, by the moving device, from an upper, upstream start position to a lower, downstream end position of the first spraying device, during which step c) steps a) and step b) are executed, the method further comprising step d) moving the first spraying device, by the moving device, back from the end position to the start position. This means that the first spraying device is moved in a moving direction having a horizontal component parallel to the conveying direction and a vertical component perpendicular to the conveying direction.

In order to efficiently make use of the washing liquid as well as to reduce energy consumption in a further embodiment the supply of pressurized washing liquid to the multiple nozzles of the first and second spraying devices is interrupted during step d).

In an embodiment, said higher liquid pressure is higher than said lower liquid pressure by a factor 4 to 100, preferably by a factor 7.5 to 30. In an embodiment, said higher liquid pressure is in the range of 40 to 200 bar, preferably 60 to 120 bar, and said lower liquid pressure is in the range of 2 to 10 bar, preferably 2 to 8 bar, more preferably 4-7 bar. Setting the pressure difference in such a manner contributes to an effective washing while reducing the chance of damaging the carcass parts during the washing. Suitable higher and lower liquid pressures may depend on a timespan between sawing and washing, on the temperature of the environment, or on other factors. Sawing may be sawing a (whole) carcass part into two half carcass parts by splitting it along the spine.

In an embodiment, the carcass parts are carcass halves, preferably cattle carcass halves, wherein the carcass halves are suspended by a leg joint, preferably an ankle joint, and conveyed through the washing device with an inner, bone side of the carcass half facing the first spraying device and an outer, fat side of the carcass half facing the second spraying device.

In an embodiment, nozzles of the multiple nozzles of the first spraying device are provided in at least two horizontal rows of nozzles provided at different vertical levels, wherein the method comprises, for the purpose of step b), providing the washing liquid to nozzles of a row at a lower vertical level at a higher liquid pressure than a lower liquid pressure at which washing liquid is provided to nozzles of a row at a higher vertical level. This way, the effectiveness of the first spraying device may be further improved. Said lower liquid pressure at which washing liquid is provided to nozzles of a row at a higher vertical level may be equal to the lower liquid pressure at which washing liquid is provided to the second spraying device. Said lower row may have low pressure nozzles in a middle section of the row, in between high pressure nozzles in respective side sections.

In an embodiment, the washing device has a moving device for moving the first spraying device between an upper, upstream start position and a lower, downstream end position.

In an embodiment, the washing device comprises a controller which is operatively connected to the moving device and arranged to control the moving device in use such that while the first spraying device is moved in the moving direction, washing liquid is sprayed against a carcass part passing between the spraying devices.

In an embodiment, the first spraying device is moved, using the moving device and preferably controlled by the controller, such that it moves in the conveying direction in a synchronised manner with a carcass part passing through the washing device.

In an embodiment, the controller is operatively connected to the respective pivoting devices and arranged to control said pivoting devices such that while the first spraying device is moved in the moving direction, the nozzles of the multiple nozzles are pivoted in a reciprocating manner while washing liquid is sprayed against a carcass part passing between the spraying devices.

In an embodiment, the second spraying device is provided stationary along the conveying path. This reduces energy consumption while the washing of the outer side of the carcass parts may still be performed in an effective manner. In an alternative embodiment, the washing device comprises a further moving device for moving the second spraying device in a reciprocating manner, in a further horizontal moving direction which is parallel to the conveying direction, and preferably in a synchronised manner with respect to the moving of the first spraying device.

In an embodiment, the second spraying device is positioned at an intermediate position in between the start position and the end position, seen in the conveying direction, preferably wherein the intermediate position is at a distance from the start position, seen in the conveying direction, in a range between 35 and 65 percent of a distance in the conveying direction between the start position and the end position.

In an embodiment, the multiple nozzles of the second spraying device are provided such that a carcass part, while moving past the second spraying device, is subjected to washing liquid expelled by the multiple nozzles of the second spraying device over at least 75% of a length of the carcass part, the length of the carcass part being a dimension thereof in the vertical direction, preferably wherein the multiple nozzles of the second spraying device are provided in one or more vertical rows of nozzles. This way, an effective washing may be realised even when the second spraying device is stationary.

In an embodiment, the moving device has a stationary horizontal guide and has a vertical guide which is movable along the horizontal guide parallel to the conveying direction, wherein the multiple nozzles of the first spraying device are movable along the vertical guide.

In an embodiment, nozzles of the multiple nozzles of the first spraying device are provided in at least two horizontal rows of nozzles provided at different vertical levels. A vertical distance between an upper row and a lower row of said at least two horizontal rows of nozzles may be in the range of 0.1 to 0.5 m, preferably in the range of 0.2-0.4 m.

In an embodiment, the nozzles of a row at a higher vertical level are subdivided into two groups which are spaced apart at a distance in the conveying direction. This way, leg parts of two halves belonging to the same carcass which are conveyed through the washing device directly following each other, may effectively be washed while avoiding spraying washing liquid in a space between said leg parts.

In an embodiment, nozzles of a row at a higher vertical level have a larger spray angle than a smaller spray angle of nozzles of a row at a lower vertical level. The lower row may have nozzles having the larger spray angle as well, preferably in the middle section thereof. The larger spray angle may be between 35 and 50 degrees, preferably about 40 degrees, while the smaller spray angle may be between 15 and 30 degrees, preferably about 25 degrees. In an embodiment, nozzles provided with washing liquid at the higher liquid pressure may have the smaller spray angle while nozzles provided with washing liquid at the lower liquid pressure may have the larger spray angle. A smaller spray angle contributes to subjecting the carcass part to a more concentrated flow to remove dirt from difficult parts. In an embodiment, the nozzles may have a flat spray form, preferably flat in a horizontal direction.

In an embodiment, a conveying speed of the carcass parts through the washing device may be between 0.5 and 2 m/s, for example about 1 m/s.

In an embodiment, each pivoting device is configured to pivot the associated nozzles in a reciprocating manner through an angle in the range of 45 to 135 degrees, preferably of 70 to 110 degrees.

In an embodiment, nozzles supplied with washing liquid at the higher pressure are made of stainless steel while nozzles supplied with washing liquid at the lower pressure are made of brass.

Generally, the invention provides a system and method of washing meat carcass parts such as cattle carcass halves suspended from and conveyed by an overhead conveyor. The method is executed using a washing device comprising a first spraying device on a first side and a second spraying device on a second side of a processing path, wherein the first and second spraying device each have multiple pivotable nozzles. The method comprises supplying pressurized washing liquid to the nozzles and nozzles are pivoted, wherein the washing liquid is provided to at least some of the multiple nozzles of the first spraying device at a higher liquid pressure than a lower liquid pressure at which washing liquid is provided to the multiple nozzles of the second spraying device.

Embodiments of the invention described in relation to the method according to the invention apply in an analogous manner to the device according to the invention, and vice versa. Effects of embodiments of the method also apply to embodiments of the device according to the invention, and vice versa.

BRIEF DESCRIPTION OF DRAWINGS

The present invention is described hereinafter with reference to the accompanying schematic drawings in which embodiments of the present invention are shown and in which like reference numbers indicate the same or similar elements.

FIG. 1a shows, viewed parallel to the conveying direction, an embodiment of a washing device according to the invention;

FIG. 1b shows the washing device of FIG. 1a in a state thereof in which a cattle carcass half is being conveyed through the washing device;

FIG. 1c shows a 3D representation of the washing device of FIG. 1a wherein housing parts of a side of the device has been omitted from the figure.

FIG. 2a shows a frontal view of only a second spraying device of the washing device of FIG. 1a;

FIG. 2b shows a 3D representation of the part of the washing device shown in FIG. 2a;

FIG. 3a shows a frontal view of only a first spraying device of the washing device of FIG. 1a in an upstream start position thereof;

FIG. 3b shows a 3D representation of the part of the washing device shown in FIG. 3a;

FIG. 5a shows the part of the washing device shown in FIG. 3a, including two cattle carcass halves belonging to the same cattle carcass; and FIG. 5b shows the part of the washing device shown in FIG. 4a, including the two cattle carcass halves belonging to the same cattle carcass as also shown in FIG. 5a but after being conveyed over a distance through the washing device with respect to FIG. 5a;

FIG. 8b shows, viewed parallel to the conveying direction, the washing device of FIG. 8a.

DESCRIPTION OF EMBODIMENTS

Figure 2B:
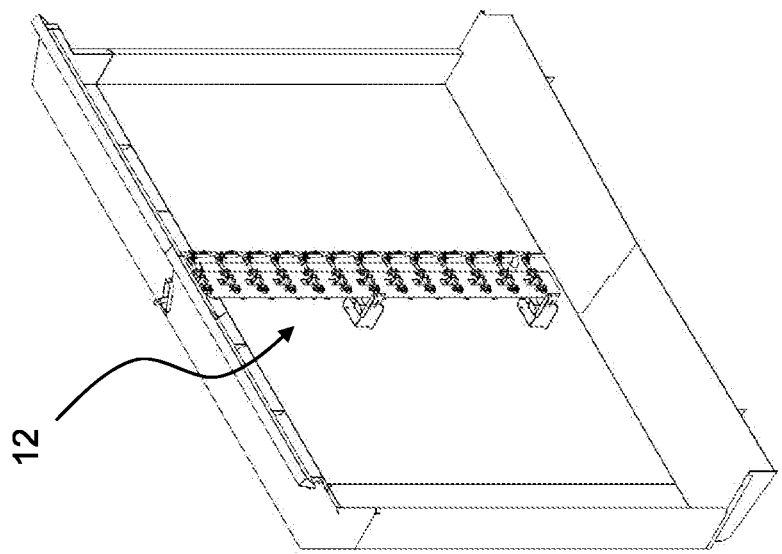

The figures show a washing device 1 for washing meat carcass parts 2. FIGS. 1b and 5a,b show two such meat carcass parts 2 by means of example in the form of cow carcass halves belonging to the same carcass, that means a left and a right half splitted along the spine, such as using an upstream sawing device. As shown, the two carcass parts 2 are suspended by the ankles from respective hooks 5 of an overhead conveyor 4 and conveyed in a conveying direction 6 along a processing path 7 in use. The processing path 7 may pass downstream and/or upstream of the washing device along various other processing devices such as a sawing device, cutting devices, inspection devices, deboning devices, and so on. A conveying speed of the carcass parts 2 is typically roughly between 0.5 and 2 m/s.

The washing device 1 has a first spraying device 10 provided on a first side 8 of the processing path 7 and a second spraying device 12 provided on a second, opposite side 9 of the processing path 7. Both the first spraying device 10 and the second spraying device 12 have multiple nozzles 10a,b,c and 12a,b for spraying a washing liquid against a carcass part 2 passing between the spraying devices 10; 12 while conveyed in the conveying direction 6 in use. See also FIGS. 6 and 7. Guide bars 41a, 41b are provided which may contact and guide the carcass parts 2 during their movement through the washing device 1. The multiple nozzles 10a,b,c of the first spraying device 10 and the multiple nozzles 12a,b of the second spraying device 12 are, at least during use, connected to a source of the washing liquid 19. This may be one and the same source of washing liquid 19 or different sources of washing liquids may be used for example for the nozzles 10a, 10b and 10c on the one hand and nozzles 12a and 12b on the other hand.

Figure 6:
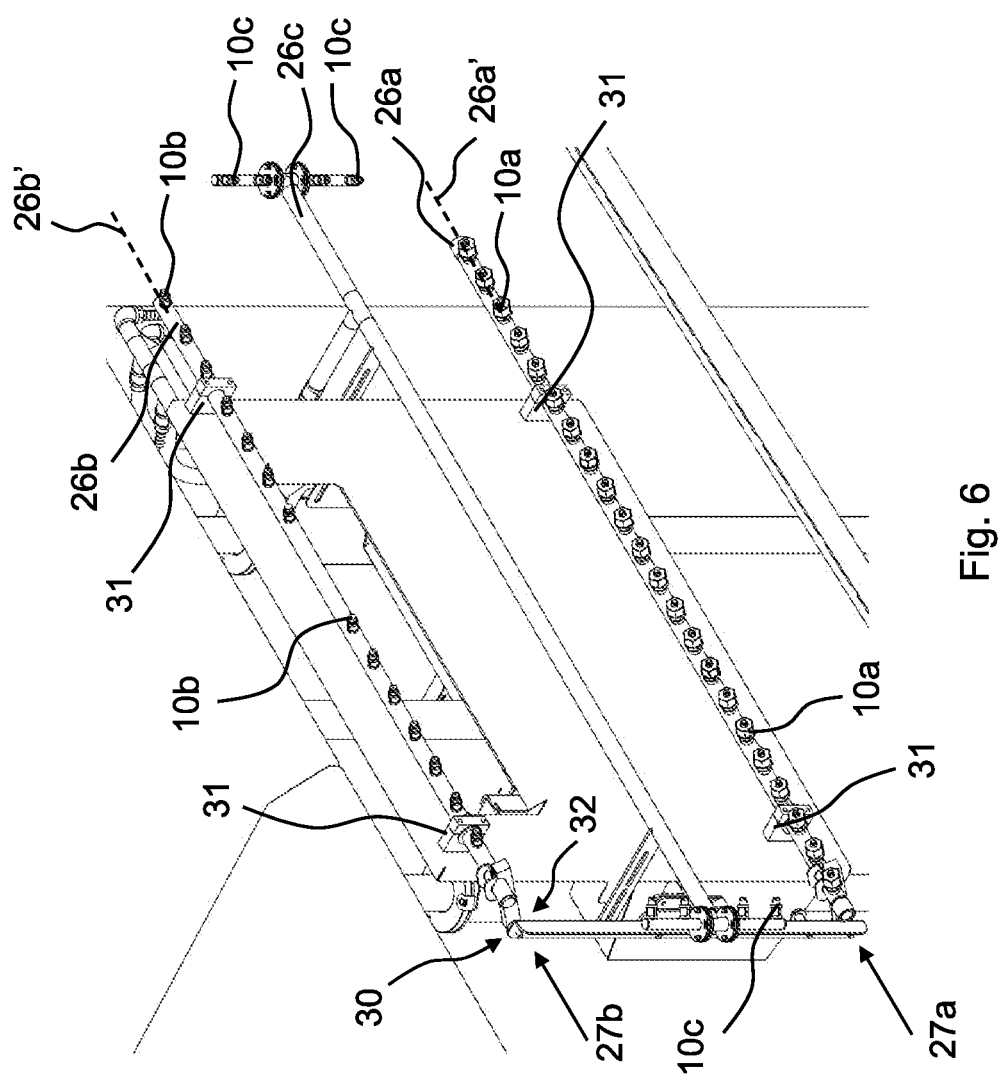
FIG. 6 shows the first spraying device in more detail.

In the present example, the first spraying device 10 comprises supply pipes 26a,b,c to which washing liquid is supplied under pressure. The multiple nozzles 10a and 10b of the first spraying device 10 are provided in at two horizontal rows of nozzles 27a and 27b provided at different vertical levels. As FIG. 6 shows, the multiple nozzles 10a of the lower row 27a are provided on a common supply pipe 26a wherein a higher liquid pressure is set in this supply pipe 26a. In an upper row 27b, at a higher vertical level than the lower row 27a, multiple nozzles 10b are provided on a common supply pipe 26b and subdivided into two groups of nozzles spaced apart at a distance: a right-side (at least in the view of FIG. 6) group of nozzles 10b and a left-side group of nozzles 10b. A lower liquid pressure is set in the supply pipe 26b.

As FIGS. 5a and 5b show, the first spraying device 10 is designed to spray washing liquid onto two carcass parts at the same time, in the present example a left and right half of the same carcass. The absence of nozzles in a central region of the upper row 27b may reduce the use of washing liquid since there is no need for nozzles in that region since they would spray between leg parts of the carcass parts for about the entire duration of the movement of the first spraying device 10.

The second spraying device 12 has two vertical rows 25a and 25b each having multiple nozzles 12a and 12b respectively, connected to a common supply pipe 28, at a lower liquid pressure. Using the first spraying device 10 and the second spraying device 12, the carcass parts 2 can be sprayed with the washing liquid from a front side as well as from a rear side. During use, said higher liquid pressure is in the range of 40 to 200 bar, for example about 100 bar, and said lower liquid pressure is in the range of 2 to 10 bar, for example 6 bar. The lower liquid pressure in the supply pipe 27 and in supply pipe 28 may be equal or may be different.

In an embodiment of the invention, a low pressure liquid pump may be provided to supply washing liquid from a source of washing liquid to the above mentioned nozzles operated at the lower liquid pressure, while a separate high pressure liquid pump may be provided to supply washing liquid from the source, or from another source, of washing liquid to the above mentioned nozzles operated at the higher liquid pressure. Alternatively, one liquid pump may be used to supply pressurized washing liquid from the source of the washing liquid to the nozzles, wherein one or more pressure control valves or pressure limiting valves may be used to set the higher and the lower liquid pressures of liquid supplied to the nozzles of the first and second spraying devices.

Figure 4B:
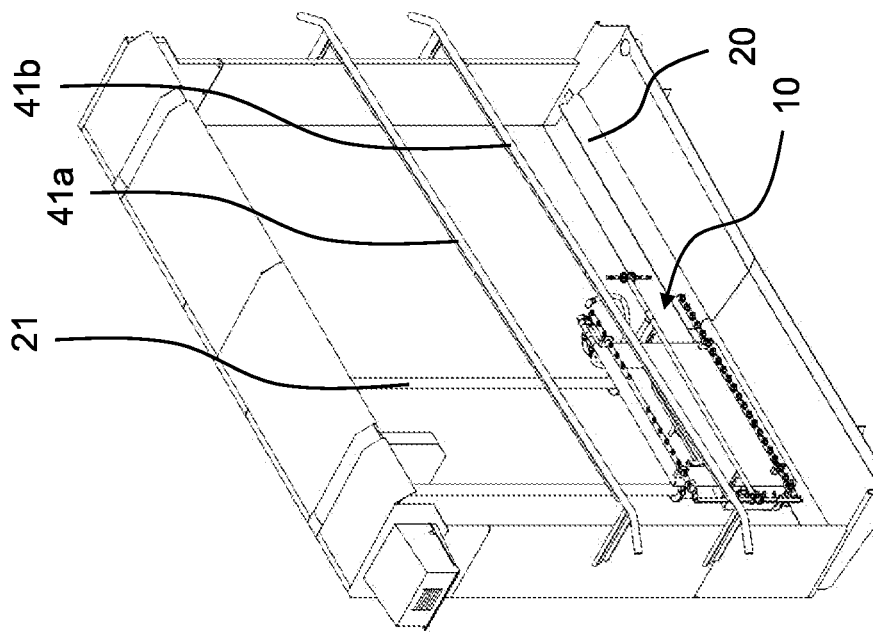
FIGS. 4a and 4b show the part of the washing device of FIGS. 3a and 3b, respectively, in a downstream end position thereof in the washing device.
Figure 4A:
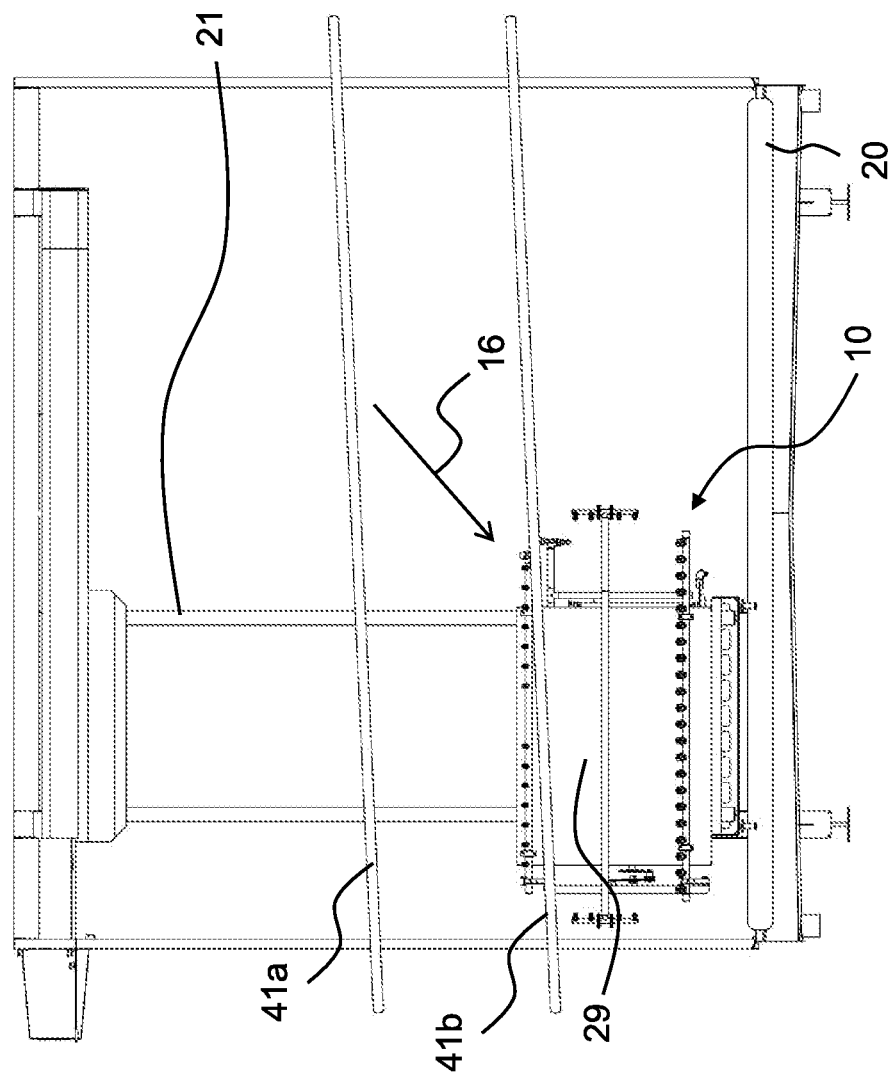

The first spraying device 10 is movable a reciprocating manner, by means of a moving device 14, in a moving direction 16 from an upper, upstream start position shown in FIGS. 3a and 3b to a lower, downstream end position shown in FIGS. 4a and 4b. The moving device 14 has a stationary horizontal guide 20 and has a vertical guide 21 which is movable along the horizontal guide 20 parallel to the conveying direction 6. The multiple nozzles 10a,b,c of the first spraying device 10 are provided on a frame 29 which is movable along the vertical guide 21, thereby the nozzles 10a,b,c are movable in a vertical direction 16 along the vertical guide 21. A path of the movement from the start position to the end position may be a linear path or a curved path. A curved path may for example be used if it is preferred that some part of the carcass parts 2 are subjected to the washing liquid for a longer time. For example, the movement from the start position may initially be more downward (in the direction 17) than forward (forward means to the left in the view of FIG. 3a, in the direction 18) which movement transitions to a movement which is more forward than downward. This way, the first spraying device 10 is besides a lower section of the carcass parts 2 for a relatively longer time.

Figure 2A:
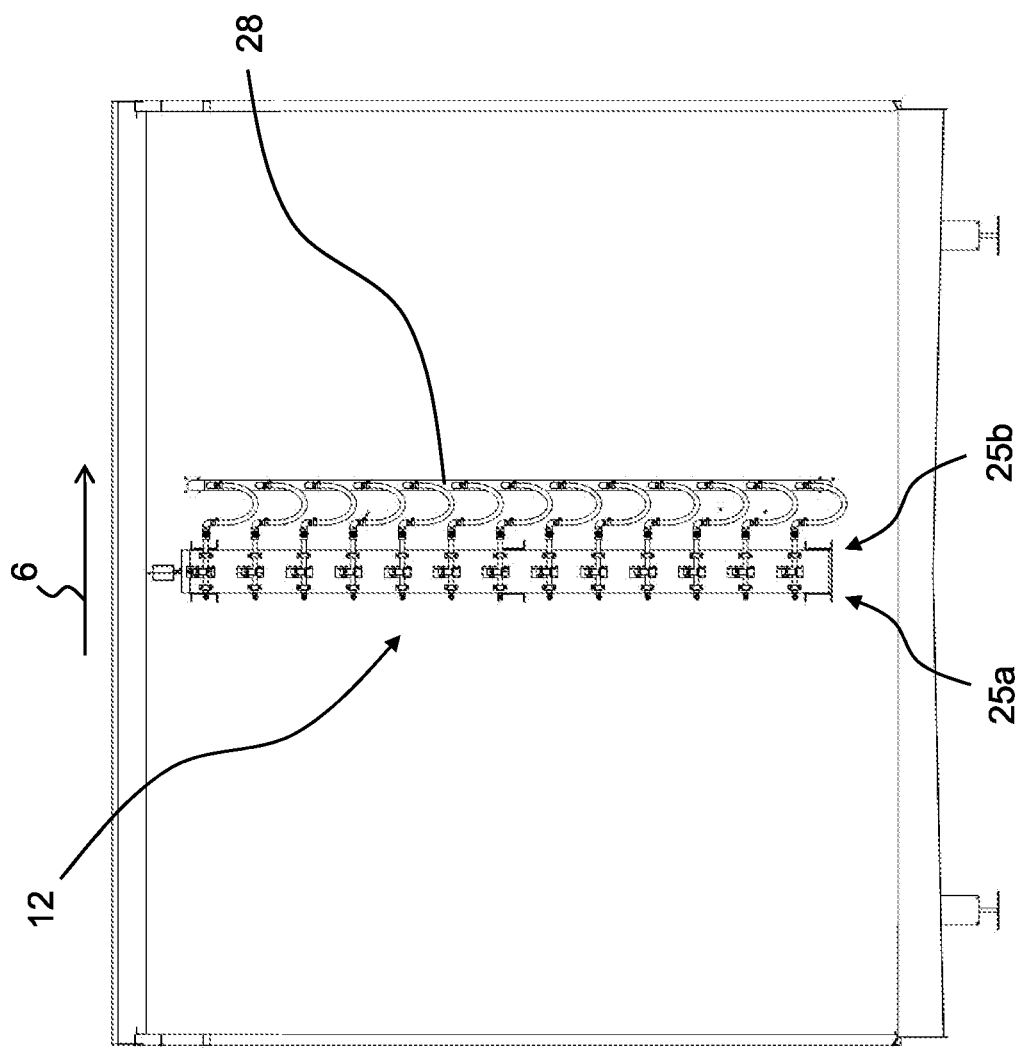

The second spraying device 12 is provided stationary along the trajectory 7, in the form of two vertical rows 25a,b of nozzles 12a,b. As FIG. 2a in comparison with FIGS. 3a and 4a shows, the second, stationary spraying device 12 is positioned at an intermediate position in between the start position and the end position of the first spraying device 10, seen in the conveying direction. As FIG. 2a shows in comparison with FIGS. 3a and 4a, the second spraying device 12 is provided, seen in the conveying direction 7, at about half of the distance in the conveying direction 6 over which the first spraying device 10 moves between its start position (FIG. 3a) and end position (FIG. 4a). The multiple nozzles 12a,b of the second spraying device 12 are provided such that a carcass part 2, while passing between the spraying devices 10; 12, is subjected to the washing liquid over at least 75% of a length thereof, the length of the carcass part 2 being a dimension thereof in the vertical direction. As FIG. 1b shows, the nozzles 12a,b of the second spraying device 12 span about the entire length of the carcass part 2 from just below the hook 5 down to the lower end of the carcass part 2, which is the neck part in the present example.

In another embodiment, a second spraying device may be provided having the same vertical nozzle arrangement as the second spraying device 12, but then mounted on a horizontal guide similar to the guide 20 so that the second spraying device is movable in the conveying direction 6, for example to move jointly with the first spraying device over at least a part of the movement thereof.

The washing device 1 also has a first pivoting device 30 for jointly pivoting the nozzles 10a and 10b of the first spraying device 10 in a reciprocating manner. For that purpose, both the supply pipes 26a and 26b are mounted rotatably in respective supports 31 so that the respective nozzles 10a and 10b pivot about horizontal pivot axes 26a' and 26b' defined by the respective axes of rotation of the supply pipes 26a,b. A crank-coupler linkage 32 is provided for realising the reciprocating pivoting of the supply pipes 26a,b and thus of the nozzles 10a,b. Although the pivoting angle may be equal for all the nozzles 10a,b in the present example, the nozzles 10b of the upper row are pivoted over about 40 degrees while the nozzles 10a of the lower row are pivoted over about 25 degrees. The nozzles 10c are provided in a non-pivoting manner.

Figure 7:
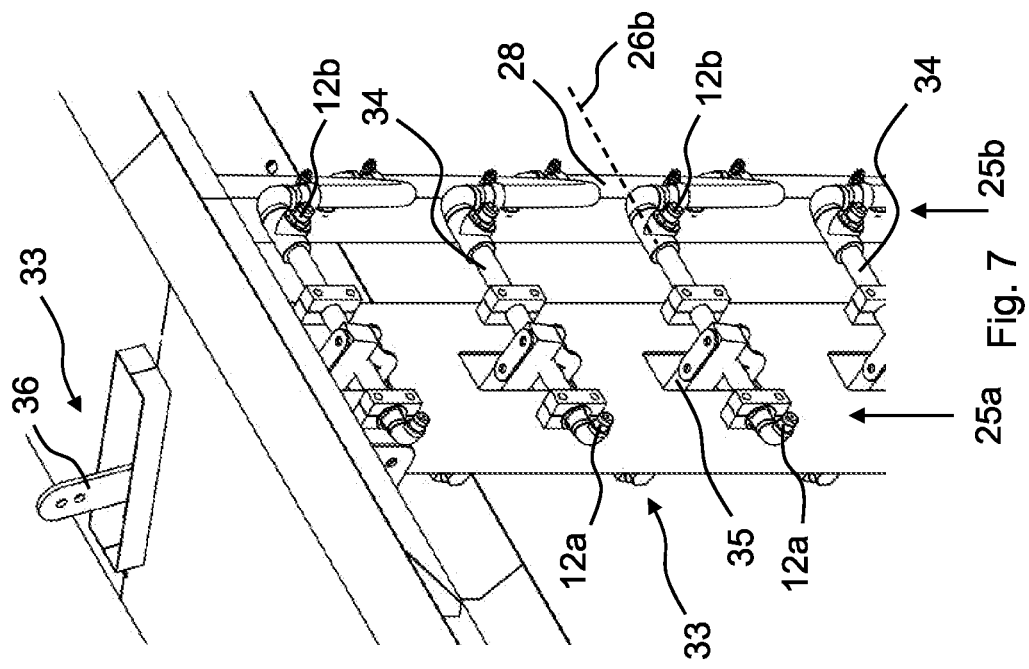
FIG. 7 shows the second spraying device in more detail.

Similarly, the washing device 1 has a second pivoting device 33. Each two nozzles 12a,b on the same vertical level are provided on a common pipe section 34 which can be pivoted about a horizontal pivot axis 34' via respective couplers 35, fixated to each of the pipe sections 34 as FIG. 7 shows, wherein all the couplers 35 are connected to a vertical crank 36. The crank 36 can be translated in a reciprocating manner in a vertical direction by a drive mechanism not shown so that the couplers 35, and thereby the nozzles 12a,b make a pivoting movement, in the present example over an angle of about 40 degrees.

The washing device 1 also has a controller 40 which is operatively connected to the moving device 14 and to the respective pivoting devices 30; 33 and arranged to control said devices in use such that while the first spraying device 10 is moved in the moving direction 16 and the nozzles 10a,b and 12a,b are pivoted in a reciprocating manner while washing liquid is sprayed against a carcass part 2 passing between the spraying devices 10; 12. The controller 40 is configured to provide the washing liquid to at least some nozzles 10a of the multiple nozzles 10a,b,c of the first spraying device 10 at a higher liquid pressure which is higher than a lower liquid pressure of the washing liquid provided to the multiple nozzles 12a, b of the second spraying device 12, as further detailed above. Although the controller 40 is displayed as being provided on a housing 50 of the washing device 1, the controller may alternatively be provided at another location separate from the washing device and connected wired or wirelessly to the washing device during use.

In an embodiment of a method according to the invention, preferably using the washing device 1, the carcass parts 2, preferably cattle carcass halves, are being washed while suspended from an overhead conveyor 4 and are conveyed in a conveying direction 6 along a processing path 7. An inner, bone side of the carcass faces the first spraying device 10 and an outer, fat side of the carcass faces the second spraying device 12.

In accordance with the method, the following steps are executed repetitively:

a) the first spraying device 10 is moved, by the moving device 14, from the start position to the end position thereof, wherein during step a):

b) pressurized washing liquid is supplied to the multiple nozzles 10a,b,c of the first spraying device 10 and to the multiple nozzles 12a,b of the second spraying 12 device such that the carcass part 2 is being sprayed with the washing liquid from opposite sides while the carcass part 2 passes between the spraying devices 10; 12 while conveyed in the conveying direction 6. The washing liquid is supplied at an above mentioned higher liquid pressure of about 100 bar to nozzles 10a of the lower row 27a and at an above mentioned lower liquid pressure of about 6 bar to the nozzles 10b of the higher row 27b of the first spraying device 10 and to the nozzles 10c of the first spraying device. The washing fluid is supplied at the lower liquid pressure to the multiple nozzles 12a,b of the second spraying device 12. During execution of the step a), also a step c) is carried out wherein nozzles 10a,b of the multiple nozzles of the first spraying device 10 and wherein nozzles 12a,b of the second spraying device 12 are pivoted in a reciprocating manner, using the respective pivoting devices 30; 33.

The method further comprises the step d) wherein the first spraying device 10 is moved, by the moving device 14, back from the end position to the start position, while the supply of pressurized washing liquid to the multiple nozzles of the first and second spraying devices is interrupted.

Figure 8B:
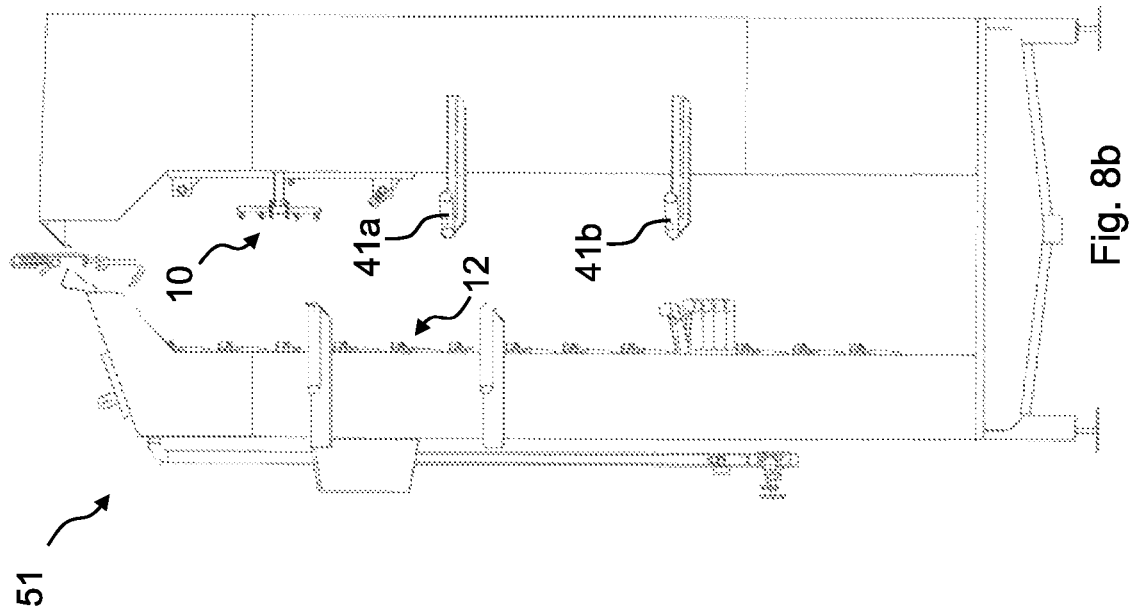
Figure 8A:
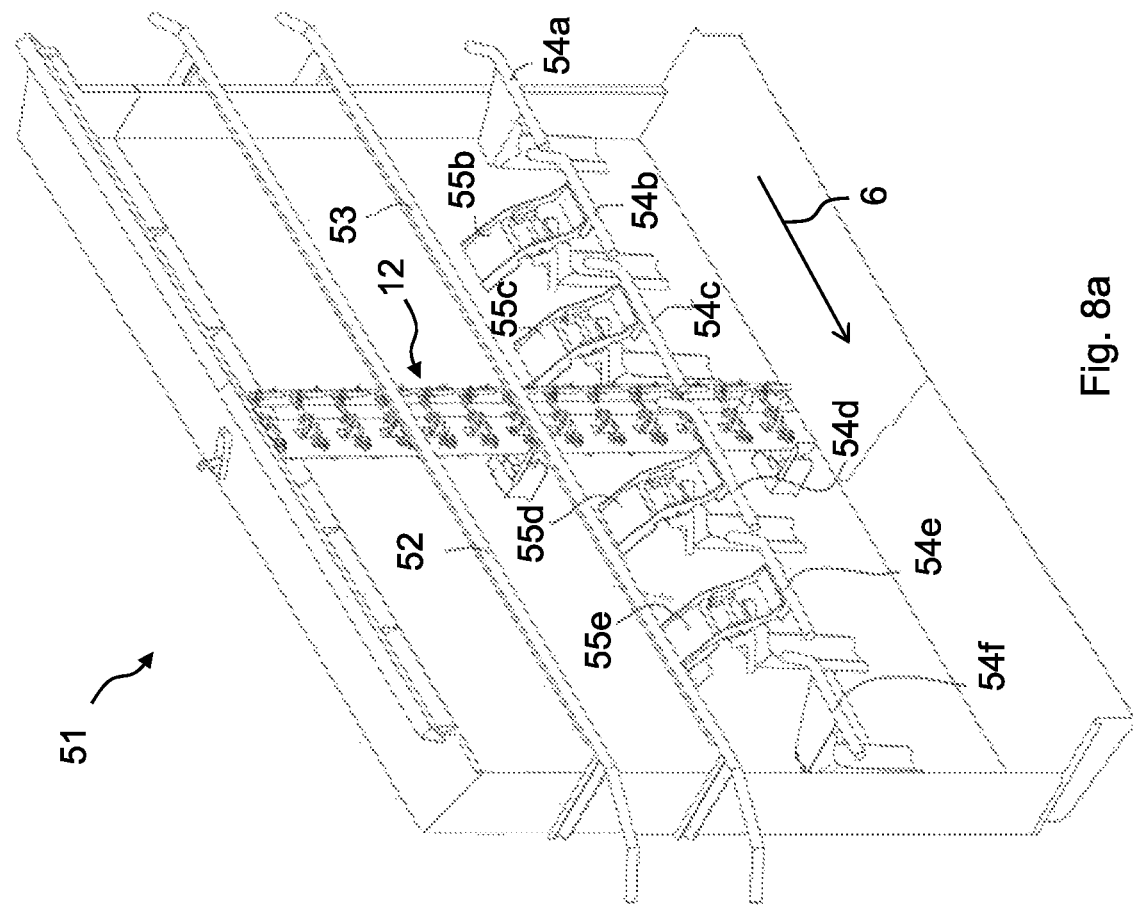
FIG. 8a shows a 3D representation of an alternative embodiment of a washing device according to the invention wherein housing parts of a side of the device has been omitted from the figure.

In an alternative embodiment which is shown in FIGS. 8a and 8b a washing device 51 comprises guide elements which are not only provided at the side of the first spraying device 10 but also at the opposite side, so at the side of the second spraying device 12. More specifically on the side of the second spraying device 12 washing device 51 comprises upper guide bar 52, middle guide bar 53 and a set of aligned lower guide bars 54a to 54f. Guide bars 52 to 54f, like guide bars 42a, 42b, may contact and guide the carcass parts 2 during their movement through the washing device 1. Guide bars 54a to 54f allow simultaneous guidance of carcasses having different sizes. The guide bars 54a to 54f are each slightly sloping providing improved accessibility by the nozzles of the first spraying device 10 to the area behind said guide bars. The washing device 51 comprises for each of the guide bars 54b to 54e an actuating device 55b to 55e with which the associated guide bars 54b can be moved horizontally towards and away from the opposite guide bars 41. In further embodiments also for guide bars 52, 53, 42a and/or 42b such actuating devices may be provided for moving the guide bars in horizontal direction perpendicular to the conveying direction 6.

The invention claimed is:

1. A method of washing meat carcass parts while the carcass parts while the carcass parts are suspended from an overhead conveyor and are being conveyed in a conveying direction along a processing path, wherein the method is executed using a washing device comprising a first spraying device provided on a first side of the processing path, a second spraying device provided on a second side, opposite the first side, of the processing path, wherein the first spraying device and the second spraying device each have multiple nozzles, and the washing device further has respective pivoting devices for pivoting nozzles of the multiple nozzles of the first spraying device and of the second spraying device in a reciprocating manner;

wherein the following steps are executed repetitively using the washing device:

a) supplying pressurized washing liquid to the multiple nozzles of the first spraying device and of the second spraying device such that the carcass part is being sprayed with the washing liquid from opposite sides while the carcass part passes between the spraying devices while conveyed in the conveying direction, wherein the washing liquid is provided to at least some of the multiple nozzles of the first spraying device at a higher liquid pressure than a lower liquid pressure at which washing liquid is provided to the multiple nozzles of the second spraying device; and b) pivoting nozzles of the multiple nozzles of the first spraying device and of the second spraying device in a reciprocating manner, using the respective pivoting devices;

wherein a first pivoting device of the first spraying device includes a crank-coupler for pivotally reciprocating a first set of pivoting nozzles and a second set of pivoting nozzles; and wherein a second pivoting device of the second spraying device includes a vertical crank for translating a second set of pivoting nozzles.

2. The method according to claim 1, wherein the washing device comprises a moving device for moving the first spraying device and wherein the method comprises step c) moving the first spraying device, by the moving device, from an upper, upstream start position to a lower, downstream end position of the first spraying device, during which step c) steps a) and step b) are executed, the method further comprising step d) moving the first spraying device, by the moving device, back from the end position to the start position, while the supply of pressurized washing liquid to the multiple nozzles of the first and second spraying devices is interrupted.

3. The method according to claim 1, wherein said higher liquid pressure is higher than said lower liquid pressure by a factor 4 to 100.

4. The method according to claim 1, wherein said higher liquid pressure is in the range of 40 to 200 bar.

5. The method according to claim 1, wherein the carcass parts are cattle carcass halves, wherein the cattle carcass halves are suspended by a leg joint, and conveyed through the washing device with an inner, bone side of the carcass facing the first spraying device and an outer, fat side of the carcass facing the second spraying device.

6. The method according to claim 1, wherein nozzles of the multiple nozzles of the first spraying device are provided in at least two horizontal rows of nozzles provided at different vertical levels, wherein the method comprises, for the purpose of step b), providing the washing liquid to nozzles of a row at a lower vertical level at a higher liquid pressure than a lower liquid pressure at which washing fluid is provided to nozzles of a row at a higher vertical level.

7. A washing device for washing meat carcass parts suspended from an overhead conveyor and conveyed in a conveying direction along a processing path in use, the washing device comprising:

a first spraying device provided on a first side of the processing path;

a second spraying device provided on a second side, opposite the first side, of the processing path;

wherein the first spraying device and the second spraying device each have multiple nozzles for spraying a washing liquid against a carcass part passing between the first and second spraying devices while conveyed in the conveying direction in use, wherein the multiple nozzles of the first spraying device and of the second spraying device are connected to or connectable to a respective source of washing liquid;

wherein the washing device further comprises:

respective pivoting devices for pivoting nozzles of the multiple nozzles of the first spraying device and of the second spraying device in a reciprocating manner while the carcass part passes between the spraying devices while conveyed in the conveying direction in use;

wherein the washing device is configured to provide washing liquid to at least some of the multiple nozzles of the first spraying device at a higher liquid pressure than a lower liquid pressure at which washing liquid is provided to the multiple nozzles of the second spraying device;

wherein a first pivoting device of the first spraying device includes a crank-coupler for pivotally reciprocating a first set of pivoting nozzles and a second set of pivoting nozzles; and wherein a second pivoting device of the second spraying device includes a vertical crank for translating a second set of pivoting nozzles.

8. The washing device according to claim 7, wherein the washing device has a moving device for moving the first spraying device between an upper, upstream start position and a lower, downstream end position.

9. The washing device according to claim 8, wherein the moving device has a stationary horizontal guide and has a vertical guide which is movable along the horizontal guide parallel to the conveying direction, wherein the multiple nozzles of the first spraying device are movable along the vertical guide.

10. The washing device according to claim 7, wherein the second spraying device is provided stationary along the conveying path.

11. The washing device according to claim 10, wherein the second spraying device is positioned at an intermediate position in between a start position and an end position, seen in the conveying direction, wherein the intermediate position is at a distance from the start position, seen in the conveying direction, in a range between 35 and 65 percent of a distance in the conveying direction between the start position and the end position.

12. The washing device according to claim 10, wherein the multiple nozzles of the second spraying device are provided such that a carcass part, while moving past the second spraying device, is subjected to washing liquid expelled by the multiple nozzles of the second spraying device over at least 75% of a length of the carcass part, the length of the carcass part being a dimension thereof in the vertical direction, wherein the multiple nozzles of the second spraying device are provided in one or more vertical rows of nozzles.

13. The washing device according to claim 7, wherein nozzles of the multiple nozzles of the first spraying device are provided in at least two horizontal rows of nozzles provided at different vertical levels.

14. The washing device according to claim 13, wherein the nozzles of a row at a higher vertical level are subdivided into two groups which are spaced apart at a distance in the conveying direction.

15. The washing device according to claim 13, wherein nozzles of a row at a higher vertical level have a larger spray angle than a smaller spray angle of nozzles of a row at a lower vertical level.

16. The washing device according to claim 7, wherein the first spraying device further includes a set of non-pivoting nozzles.

* * * * *